United States Patent [19]

Okauchi

[11] Patent Number: 5,007,040
[45] Date of Patent: Apr. 9, 1991

[54] MAGNETIC RECORDING AND/OR REPRODUCING APPARATUS HAVING A RETAINING MECHANISM FOR A DISC-SHAPED MAGNETIC RECORD BEARING MEDIUM

[75] Inventor: Shigeki Okauchi, Tokyo, Japan

[73] Assignee: Canon Kabushiki Kaisha

[21] Appl. No.: 336,648

[22] Filed: Apr. 4, 1989

Related U.S. Application Data

[63] Continuation of Ser. No. 169,073, Mar. 16, 1988, abandoned, which is a continuation of Ser. No. 778,380, Sep. 20, 1985, abandoned.

[30] Foreign Application Priority Data

Sep. 22, 1984 [JP] Japan .......................... 59-143956[U]
Jan. 30, 1985 [JP] Japan .................................. 60-14468

[51] Int. Cl.⁵ .......................... G11B 5/48; G11B 5/62
[52] U.S. Cl. .................................. 369/270; 369/282; 360/133; 360/97.01
[58] Field of Search ............... 369/258, 275, 270, 271, 369/282, 111, 289, 290, 275.1, 275.5, 275.2; 346/135.1, 137; 360/97.01, 133, 135, 97.04

[56] References Cited

U.S. PATENT DOCUMENTS

| 3,430,966 | 3/1969 | Gregg | 369/270 |
| 4,320,833 | 3/1982 | Antoniotti et al. | 369/270 |
| 4,365,258 | 12/1982 | Geyer et al. | 346/137 |
| 4,510,508 | 4/1985 | Janssen | 346/137 |
| 4,581,667 | 4/1986 | Gerfast | 360/97 |
| 4,599,663 | 7/1986 | Saito et al. | 360/135 |
| 4,616,278 | 10/1986 | Yamaguchi et al. | 369/282 |
| 4,658,311 | 4/1987 | Sakaguchi | 360/97 |

Primary Examiner—Stuart S. Levy
Assistant Examiner—Robert Weinhardt
Attorney, Agent, or Firm—Toren, McGeady & Associates

[57] ABSTRACT

The disclosed magnetic recording and/or reproducing apparatus uses a disc-shaped magnetic recording bearing medium having a magnetizable member mounted at its center. The apparatus includes a recording and/or reproducing magnetic head and a spindle for rotating the record bearing medium. The spindle is provided with a permanent magnet for attracting the magnetizable member of the medium. The permanent magnet is magnetized in a radial direction of the spindle.

6 Claims, 5 Drawing Sheets

MAGNETIC RECORDING AND/OR REPRODUCING APPARATUS HAVING A RETAINING MECHANISM FOR A DISC-SHAPED MAGNETIC RECORD BEARING MEDIUM

This is a continuation application of Ser. No. 07/169,073, filed Mar. 16, 1988, which in turn is a continuation application of Ser. No. 06/778,380, filed Sept. 20, 1985, both are abandoned.

BACKGROUND OF THE INVENTION

1. Field of the Invention

This invention relates to magnetic recording and/or reproducing apparatus, and more particularly to magnetic recording and/or reproducing apparatus using disc-shaped magnetic record bearing media having a magnetizable members mounted at their centers, and to the magnetic recording discs themselves.

2. Description of the Prior Art

In an apparatus for recording or reproducing video signals and data signals on a storage such as a disc-shaped flexible magnetic sheet, the latter must be steadily and precisely set on the spindle for rotation. Previously, the center hub of the magnetic disc has been provided with a magnetizable plate, such as an iron ring, and the spindle has been provided with a permanent magnet to attract the magnetizable plate. The aim is to provide a steady setting of the magnetic disc by a magnetic chuck.

If the permanent magnet on the spindle has its direction of magnetization coincident with the axis of the spindle, the magnetic flux propagates through the magnetizable plate in the center hub of the magnetic sheet to the recording and/or reproducing head. This creates several potential drawbacks or disadvantages. Specifically, the head can be magnetized badly, and this can deteriorate the quality of the recording or reproducing signal because the leaking magnetic flux distorts the operation of the record bearing medium.

SUMMARY OF THE INVENTION

The present invention is based upon by considering such situations, and its main object is to render it possible to eliminate all the above-described drawbacks of the prior art.

Another object of the present invention is to provide a magnetic recording and/or reproducing apparatus for use with a disc-shaped magnetic record bearing medium having a magnetizable member mounted at its center area, wherein the spindle for rotating the record bearing medium is provided with a permanent magnet for attracting the magnetizable member, and the deterioration of the recording and/or reproducing head by the magnetic flux issuing from the permanent magnet in the spindle is prevented by simple means.

To attain these objects, according to one aspect of the present invention, the permanent magnet is magnetized in a radial direction of the spindle.

Still another object of the present invention is to provide a disc-shaped magnetic record bearing medium with means for reducing the leaking magnetic flux of the permanent magnet in the spindle of the apparatus, so that high reliability of recording and reproducing is possible.

To attain this object, according to another aspect of the invention, the disc-shaped magnetic record bearing medium is provided with bent portions on the periphery of its magnetizable plate directed toward the permanent magnet.

These and other objects, aspects and features of the invention will become apparent from the following description of embodiments thereof by reference to the accompanying drawings.

BRIEF DESCRIPTION OF THE DRAWINGS

FIG. 1 is a sectional view of the essential parts to the invention of an example of the magnetic recording and/or reproducing apparatus and the disc-shaped magnetic record bearing medium therefor whose improvements the present invention relates to.

DETAILED DESCRIPTION OF THE PREFERRED EMBODIMENTS

Figure 1:
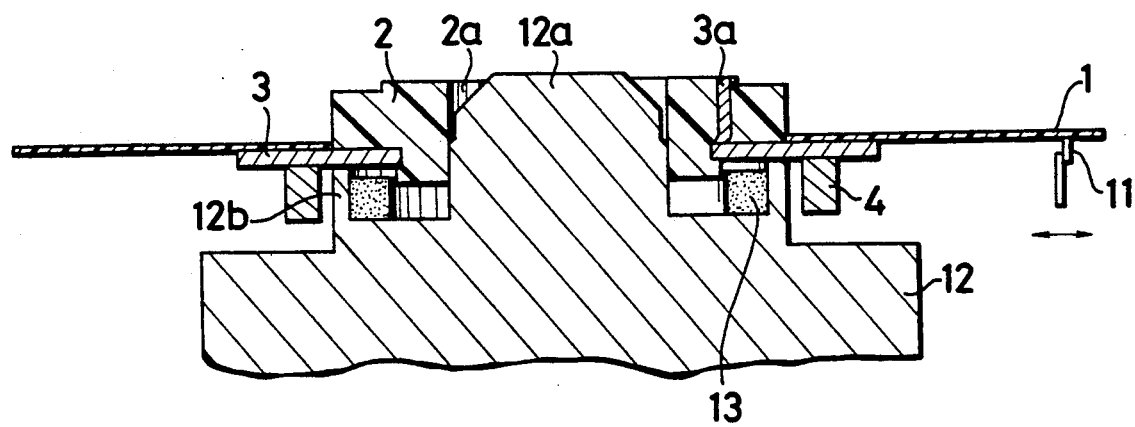

Referring first to FIG. 1, the disc-shaped magnetic record bearing medium 1 in the form of a flexible magnetic sheet has a center hub 2 made of, for example, synthetic resin at its center area. A magnetizable plate 3 such as an iron plate is buried in the center hub 2. A rotation index member 3a is formed by bending off a portion of the magnetizable plate 3. The magnetic sheet 1 is necessarily housed in a cassette, jacket, or other suitable container, the illustration of which is omitted here. A rib 4 extends from the magnetic sheet 4 through an apertured portion of the magnetic sheet container and projects outwardly thereof for positioning of the sheet 1.

A recording and/or reproducing head 11 is arranged to face the recording or lower surface of the magnetic sheet 1 and to shift by known means (not shown) in directions indicated by arrows, that is, radial directions of the magnetic sheet 1. A spindle 12 is drivingly connected to the output shaft of an electric motor (not shown). Spindle 12 has a top end portion 12a on which a central hole 2a of the hub 2 is precisely fitted, and a cup-shaped flanged portion 12b. A ring-shaped permanent magnet 13 is fixedly secured to the bottom of the flanged portion 12b to attract the magnetizable plate 3.

Therefore, when the magnetic sheet 1 is put on the spindle 12 while the central hole 2a of the center hub 2 is aligned to the top end portion 12a, the magnetizable plate 3 is attracted by the permanent magnet 13 until the magnetic sheet 1 is pulled down to and steadily set on the flange 12b. As the spindle 12 then rotates, the magnetic sheet 1 is rotated relative to the magnetic head 11. The head 11 thus records or reproduces signals.

Figure 2A:
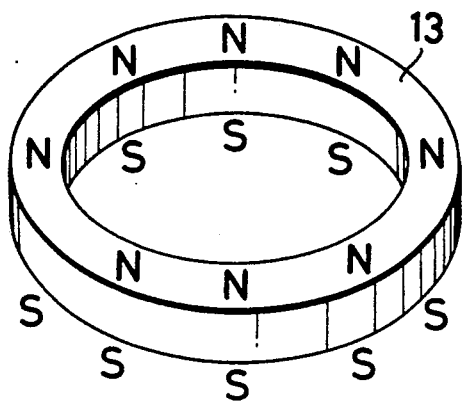
FIGS. 2A to 2C are views illustrating a prior known permanent magnet having a polarity directed parallel to the axis of the spindle and showing the loop formed by its magnetic flux in the apparatus of FIG. 1.
Figure 2B:
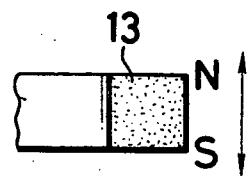
Figure 2C:
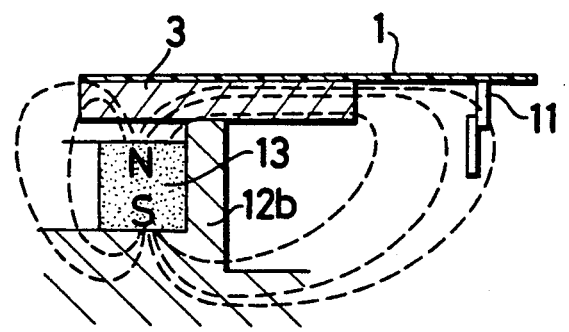

When the ring-shaped permanent magnet 13 is magnetized in a direction of its thickness, or in parallel to the axis of the sprindle 12 as shown in FIGS. 2A and 2B, it results that, as shown in FIG. 2C, the magnetic flux issuing from the permanent magnet 13 leaks through the magnetizable plate 3, reaching the head 11. Thereby, either the head 11 is magnetized, or the leaking magnetic flux becomes very harmful to the recording or reproducing performance of the head.

Figure 3A:
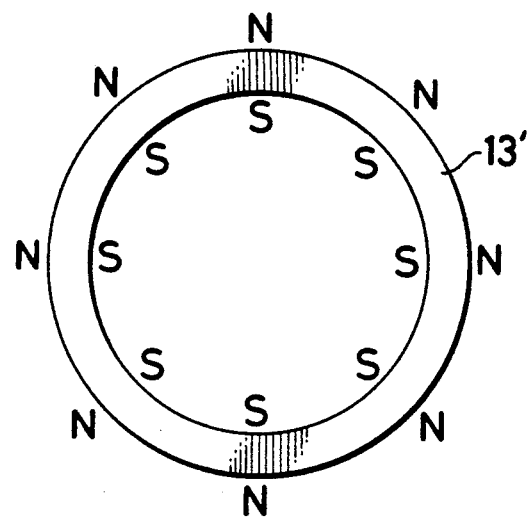
FIGS. 3A to 3C are views similar to FIGS. 2A to 2C, respectively, except that the present invention is applied to the permanent magnet.
Figure 3B:
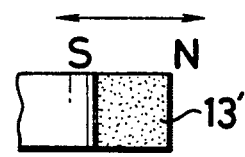
Figure 3C:
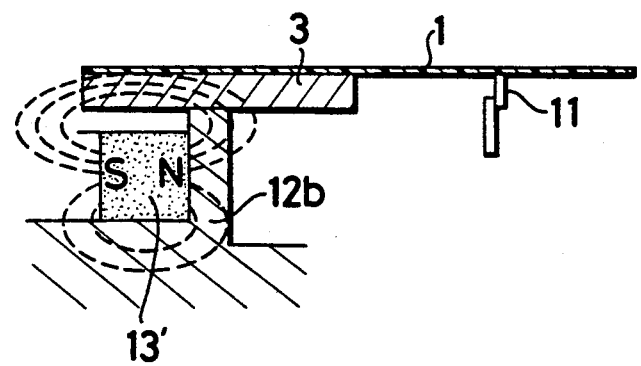

In an embodiment of the invention, therefore, as shown in FIGS. 3A and 3B, use is made of a single layer ring-shaped permanent magnet 13' having a polarity not across the thickness thereof but in a radial direction thereof, that is, in a radial direction of the spindle 12, over the entire length of its circle. As seen in FIG. 3C, the magnet 13' is a single layer in the longitudinal direction of the spindle 12. Therefore, a magnetic flux issuing from the N pole of the permanent magnet 13' after curving to the magnetizable plate 3 of the center hub 2 immediately goes backward to the S pole, as shown in FIG. 3C. Moreover, in this case, the magnetic loop becomes smaller. These two facts remarkably reduce the possibility of occurrence of magnetostriction in the head 11 or for the recording or reproducing performance to deteriorate badly.

Though the foregoing embodiment has been described in connection with the positioning means comprising the central hole 2a and the top end portion 12a of the sprindle 12, it is also possible to use another type of positioning means for the center hub 2, provided that the magnetizable plate 3 is arranged to be attracted by the permanent magnet 13' when the magnetic sheet 1 is steadily set on the spindle 12.

The foregoing exemplifies the one improvement of the invention which is related to the appratus itself. Additional improvements relating to the record bearing medium according to the invention are described below.

Figure 4A:
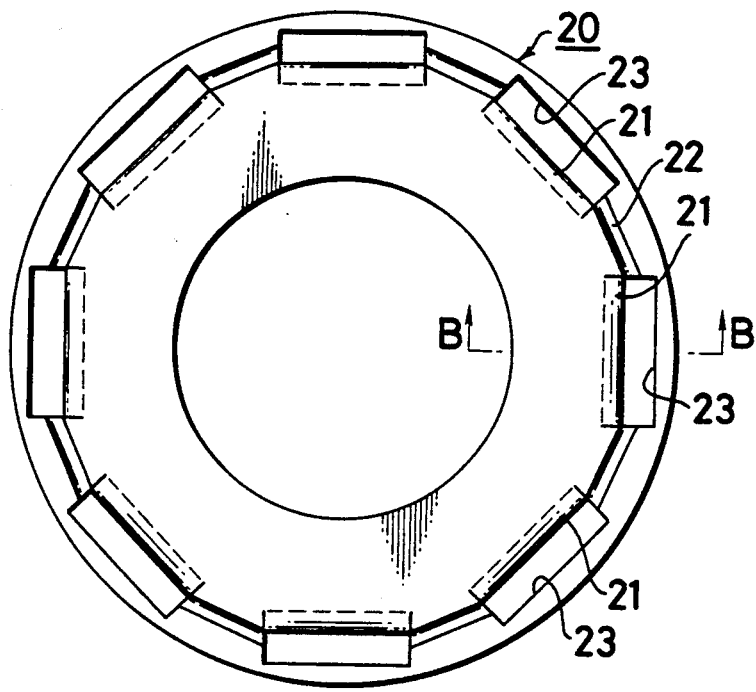
FIG. 4A is a plan view illustrating the structure of a first embodiment of the magnetizable plate according to the present invention applied to the record bearing medium of FIG. 1.
Figure 4B:
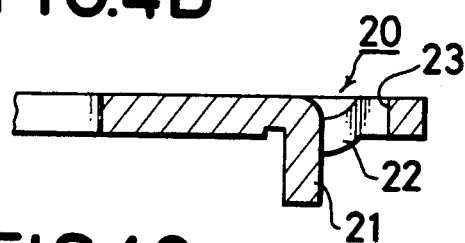
FIG. 4B is a cross-sectional view taken along line B—B of FIG. 4A.
Figure 4C:
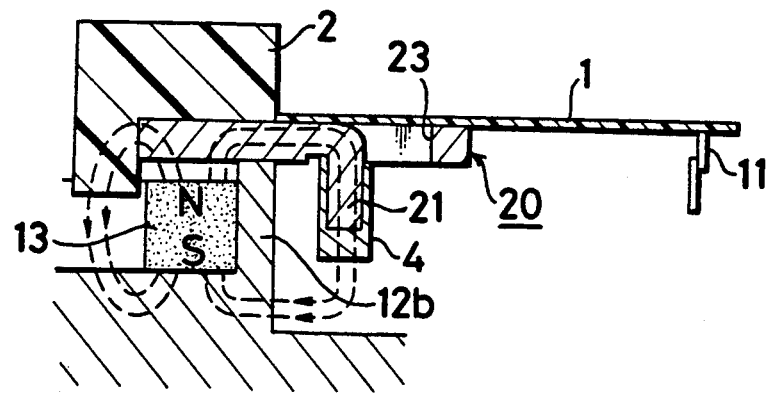
FIG. 4C is a schematic view illustrating the flow of the magnetic flux of the magnetizable plate of FIG. 4A.

FIGS. 4A to 4C illustrate a first embodiment of a record bearing medium according to the present invention.

FIG. 4A illustrates the structure of construction of a magnetizable plate provided in the central portion of the magnetic sheet. As shown in the figure, in this embodiment, a ring-shaped soft magnetizable plate 20 is provided with eight punched portions 23 of rectangular shape. Each portion 23 has three sides which form a "U" shaped, with its bottom stroke very elongated and with its open head directed to the center of the area of the plate 20. Each portion 23 is positioned in equally spaced relation along a circle concentrically near the outer periphery of plate 20.

As will be better understood from the cross-sectional view of FIG. 4B taken along line B—B of FIG. 4A, it is at the other or inner side of the rectangle that each punched portion is bent downward at right angles, providing a bent-off portion 21. For note, in FIGS. 4A and 4B, a reference numeral 22 denotes semi-circular embossed portions between the successive two punched portions 23 to be used when the location rib 4 is formed by the outsert of mold.

After a conventional location rib 4 has been installed on such a soft magnetizable plate 20, when a magnetic sheet 1 similar to that of FIG. 1 but employing the magnetizable plate 20 of the present embodiment is set on the spindle 12 having the conventional permanent magnet 13 of FIG. 1 which is magnetized in parallel to the axis of the spindle, the magnetic flux takes a loop shown in FIG. 4C. Because the magnetizable plate 20 has bent-off portions 21, the magnetic flux issuing from the N pole of the magnet 13 is guided through the bent-off portions 21 toward the S pole below, whereby the amount of magnetic flux leaked in the neighborhood of the magnetic head 11 is remarkably reduced. Therefore, a recording or reproducing error due to leaking magnetic flux of the magnet 13 the recording track and magnetic head 11 is prevented, whereby the reliability of recording and reproducing performances is increased. Also, in application to apparatus dealing with video signals, another advantage is attained that the image is protected against moiré, permitting a high quality image recording and/or reproducing apparatus to be realized.

Figure 5A:
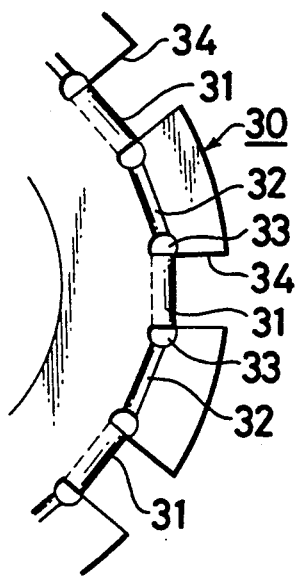
FIG. 5A is a fragmentary plan view illustrating the structure of a second embodiment of the magnetizable plate according to the present invention applied to the record bearing medium of FIG. 1.
Figure 5B:
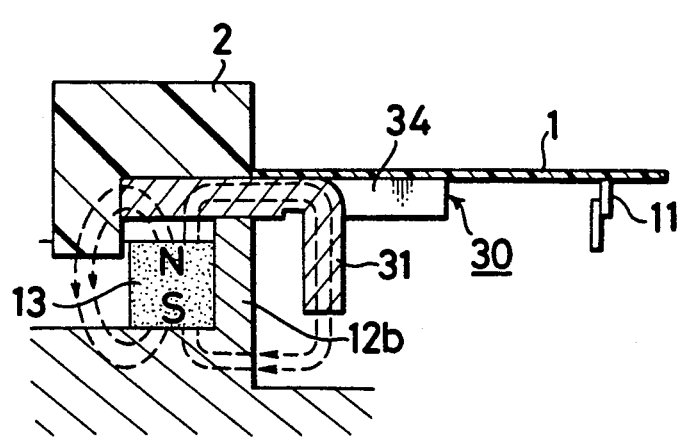
FIG. 5B is a schematic view illustrating the flow of the magnetic flux of the magnetizable plate of FIG. 5A.

FIGS. 5A and 5B illustrate a second embodiment of the record bearing medium according to the present invention.

In FIG. 5A, a magnetizable plate is partly illustrated where cutout portions 34 are extended beyond the outer periphery. More specifically, those sides of each cutout portion 34 which are punched do not form a "U" shape, but another shape with the outer side over the outer periphery of the magnetizable plate 30. The inner side is bent downward at right angles as shown in FIG. 5B, providing a bent-off portion 31 in each cutout.

According to such a constructional feature, as shown in FIG. 5B, the length of the bent-off portion 31 is longer than that shown in FIGS. 4A to 4C and the advantage is obtained that a further advance in reduction of the leaking magnetic flux of the magnet 13 is achieved.

In FIGS. 5A and 5B, a reference numeral 32 denotes similar semi-circular embossed portions to those shown in FIGS. 4A to 4C, and another reference numeral 33 denotes penetration holes for use in forming a location rib 4 in one of the embossed portions 32 by the outsert of mold.

Figure 6A:
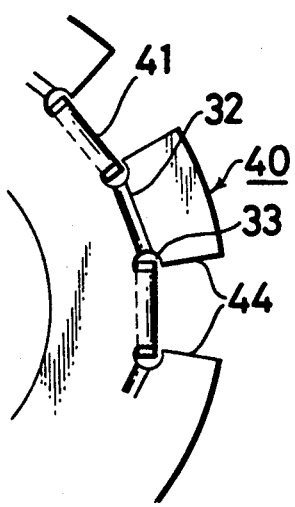
FIG. 6A is a fragmentary plan view illustrating the structure of a third embodiment of the magnetizable plate according to the present invention applied to the record bearing medium of FIG. 1.
Figure 6B:
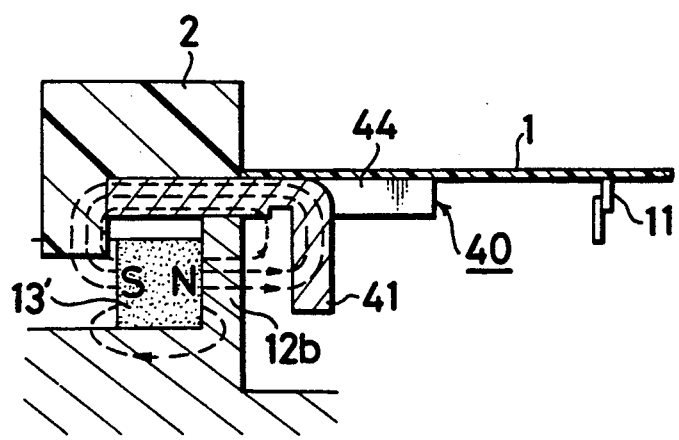
FIG. 6B is a schematic view illustrating the flow of the magnetic flux of the magnetizable plate of FIG. 6A when combined with the permanent magnet shown in FIGS. 3A and 3B.

FIGS. 6A and 6B illustrate a third embodiment of the record bearing medium according to the present invention.

FIG. 6A is similar to FIG. 5A, being a plan view of a magnetizable plate 40. As shown in the figure by a reference numeral 44, in this embodiment, the sides of each cutout are not parallel to each other, but to the radial direction of the magnetizable plate 40, or are so directed to open wider than that in sector form. This portion is bent downward at right angles as shown in FIG. 6B, providing a bent-off portion 41.

In FIGS. 6A and 6B, the same reference numerals 32 and 33 are employed to denote the similar semi-circular embossed portions and penetration holes to those shown in FIGS. 5A and 5B.

Such a constructional feature when combined with the constructional feature in the embodiment of FIGS. 3A to 3C, that is, the magnet 13' of polarity in the radial direction produces the advantage, as shown in FIG. 6B, that a larger shielding of the leaking magnetic flux is obtained. In more detail, with the magnet 13' magnetized in the radial direction, when the magnetic sheet 1 is put on the spindle 12, the magnetic flux issuing from the N pole of the magnet 13' soon enters the end of the magnetizable plate 40. Therefore, leaking toward the magnetic head 11 is lessened. Furthermore, by providing such bent-off portions 41 as described above, a larger shielding effect is obtained. Since, in this case, the larger the area of shielding the leaking magnetic flux of the magnet 13', the better the result, it is preferred to form the bent-off portions 41 to the sector shape as has been described above.

As has been described in greater detail above, according to an aspect of the present invention, the disc-shaped magnet record bearing medium is provided with a magnetizable member in the center hub, and a permanent magnet for attracting the magnetizable member is used in the spindle for rotating the record bearing medium of the magnetic recording and/or reproducing apparatus. This provides a simple means for preventing the magnetic recording and/or reproducing head from deteriorating badly because of magnetic flux issuing from the permanent magnet on the spindle.

According to another aspect of the present invention, a disc-shaped magnet record bearing medium is used with a magnetic recording and/or reproducing apparatus having a permanent magnet in the rotary spindle, and the magnetizable plate is provided with means for shielding the leaking meagnetic flux of the permanent magnet in the simple, inexpensive form of a number of bent portions of direction toward the magnet over the entire length of the periphery of the magnetizable plate. As a result, high reliable recording and/or reproducing is performed.

It should be understood that the present invention is not confined to the illustrated embodiments and is applicable to a wide variety of combinations of magnetic recording and/or reproducing apparatus employing the magnet chucking method and disc-shaped magnet record bearing media therefor within the spirit and scope of the appended claims.

What is claimed is:

1. A disc-shaped magnetic record bearing medium for a magnetic recording and/or reproducing apparatus, said apparatus comprising a magnetic head and a spindle having a magnet thereon, said medium having a central portion ring-shaped magnetizable member attached to the central portion, said medium being so arranged that said magnetizable member is attracted by the magnet on said spindle in the state where said medium is mounted on said spindle, said magnetizable member having a plurality of projections formed by bending portions near the outer periphery of said magnetizable member over the entire periphery, and said projections being located between said head and said magnet, spaced by a predetermined distance from the outer periphery of said magnet, said projections being located at an outside of a part where said magnetizable member and said spindle having the magnet thereon are attached to each other, thereby shunting a sideward leakage of a magnetic flux from said magnet.

2. The medium according to claim 1, wherein said projections are formed by notching the outer periphery of said magnetizable member towards the inside of said magnetizable member and bending the inside portions of said notch in a right angle towards the magnet so that said projections are positioned between said magnet and said head to intercept a leakage flux generated from said magnet to the head.

3. The medium according to claim 2, further having:
   a center plastic hub affixed to the central part of the medium;
   said magnetizable member being affixed to said center hub.

4. In a magnetic recording and/or reproducing system, a combination comprising:
   (a) a magnetic head;
   (b) a spindle having a ring-shaped magnet around a center portion thereof and formed in a single layer in a longitudinal direction of the spindle, said magnet being magnetized only in a radial direction of the spindle, and said magnet being located at an inner position relative to said head; and
   (c) a disc-shaped magnetic record bearing medium having a magnetizable member attached to a central part thereof and adapted to be attracted by said magnet, said magnetizable member having projections projected towards said magnet, said projections being positioned between said head and said magnet, said projections being provided near the outer periphery of the magnetizable member over the entire periphery, and said projections being located at an outside of a part where said magnetizable member and said spindle having the magnet thereon are attracted to each other, thereby shutting a sideward leakage of a magnetic flux from said magnet.

5. The combination according to claim 4, wherein said medium has a center plastic hub having a central hole, said magnetizable member is ring-shaped and affixed to said center hub; said spindle has an engaging part engageable with said center hub at said central hole; and said magnet is affixed to said spindle so that the magnet surrounds said engaging part of the spindle.

6. The combination according to claim 5, wherein said magnetizable member has an outer marginal part, said projections being provided near said outer marginal part.

* * * * *